United States Patent Office 2,814,146
Patented Nov. 26, 1957

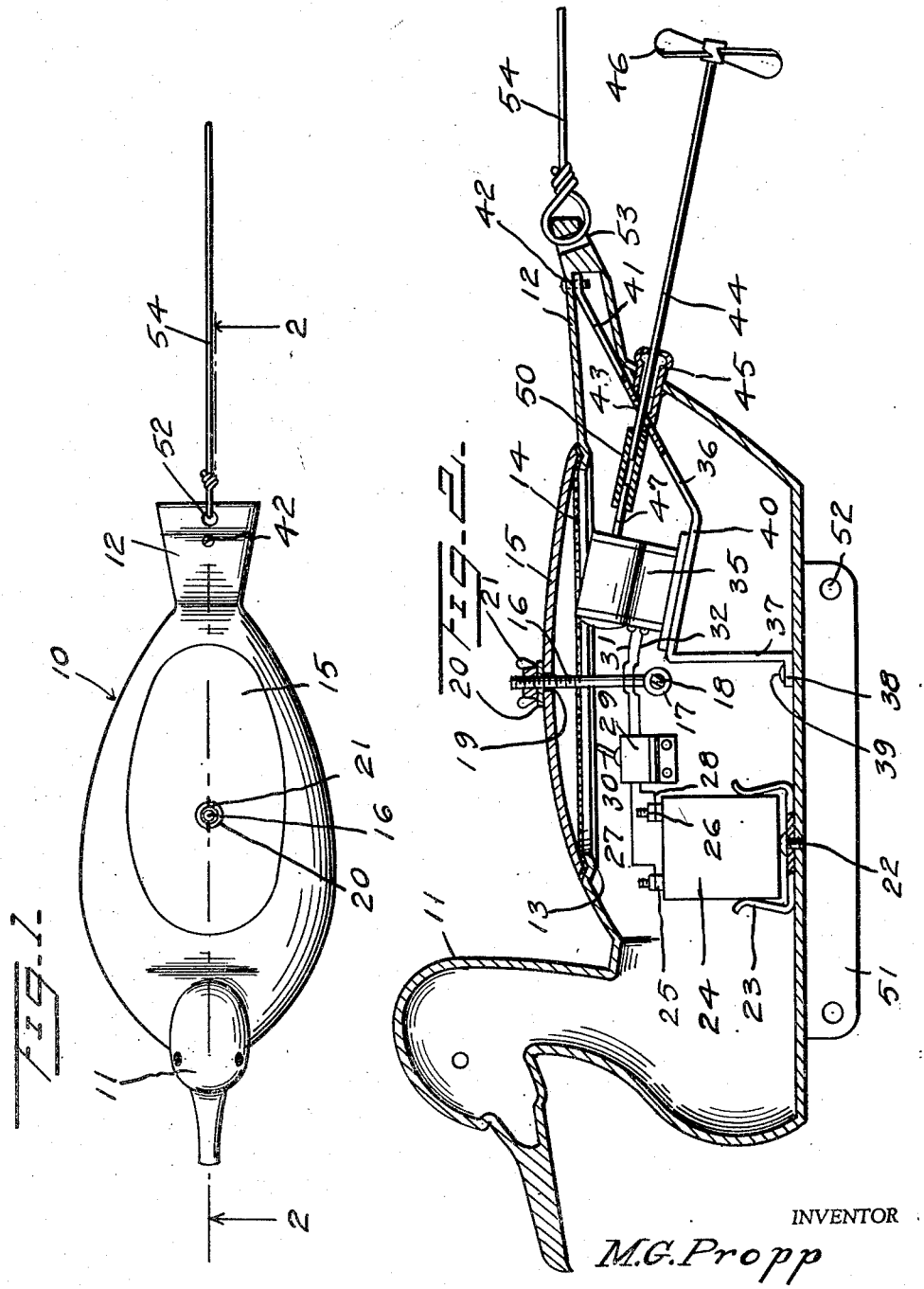

2,814,146

MECHANICAL DUCK

Melvin G. Propp, Salem, Oreg.

Application August 13, 1954, Serial No. 449,667

1 Claim. (Cl. 43—3)

This invention relates to a decoy, and more particularly to a mechanical, power driven duck decoy.

The primary object of this invention is the provision of an improved duck decoy driven by an electric motor which in turn is driven by a battery, both motor and battery being contained within the body of the decoy.

An additional object of the invention is the provision of a flexible connection between the driven shaft of the motor, and the propeller shaft, whereby the propeller shaft is yieldably mounted, to avoid breakage upon striking an obstruction or the like.

An additional object of the invention is the provision of a decoy of this nature wherein a reversing switch is interposed between the battery and the motor in order that the decoy may be moved forwardly or backwardly in simulation of a feeding duck.

Still other objects will in part be obvious and in part be pointed out as the description of the invention proceeds, as shown in the accompanying drawing, wherein there is disclosed a preferred embodiment of this inventive concept.

In the drawing:

Figure 1 is a top plan view of one form of decoy embodying features of the instant invention, and Figure 2 is an enlarged sectional view taken substantially along the line 2—2 of Figure 1, as viewed in the direction indicated by the arrows.

Similar reference characters refer to similar parts throughout the several views of the drawing.

Having reference now to the drawing in detail, there is generally indicated at 10 a hollow body which may be in simulation of a duck or other fowl as desired. The body is provided with a head 11 and a tail 12 and has an opening in the top thereof, surrounded by a grooved, inwardly extending flange 13. Seated in the groove of the flange 13 is a sealing gasket 14, upon which, in turn, seats the marginal line of a cover 15. Any suitable means may be employed for holding the cover in place, and in the illustrative embodiment shown, takes the form of a bolt 16 suitably secured as by means of an eye 17 to a shaft 18 extending transversely of the body, and extending outwardly through an aperture 19 in the cover 15. Bolt 16 is surrounded by a sealing washer 20, and the cover 15 is held in place as by means of a wing nut 21.

Suitably secured to the bottom of the interior of the body 10, as by means of a rivet 22, is a spring clip 23, which is adapted to retain a suitable dry cell or other battery 24 which includes terminals 25 and 26 respectively. From the terminals 25 and 26, wires 27 and 28 lead to a suitable three-position, reversing switch 29, including an operating handle 30, access being had to handle 30 by removal of the cover 15.

From the other side of the switch 29, wires 31 and 32 lead to the terminals of a suitable reversible electric motor 35 of any desired conventional type. The motor 35 is mounted on a bracket 36, which includes a downwardly extending leg 37 and a flange 38 which is secured as by means of a rivet 39 to the bottom of the body. A rearwardly inclined shelf portion 40 extends from the upright leg 37, and a rearwardly and upwardly inclined portion 41 extends to the top of the tail 12 of the body to which it is secured as by means of a rivet 42. The inclined leg 36 is apertured as at 43 to permit the passage of a propeller shaft 44 therethrough. Propeller shaft 44 extends outwardly through a suitable sealing portion 45 positioned in a suitable aperture in the rear of the lower side of the body, and terminates in a suitable propeller 46.

The inner end of propeller shaft 44 is connected to the driving shaft 47 of motor 35 by means of a flexible coupling sleeve 50, which preferably takes the form of a tubular rubber member or the like, surrounding the adjacent ends of shafts 44 and 47, and encases them with sufficient frictional force so that rotation of the shaft 47 will occasion, through shaft 44, rotation of the propeller 46.

The under side of the body 10 is provided with a keel 51, through which may be passed suitable apertures 52, for receiving an anchoring cord or the like as desired. Correspondingly, an aperture 53 in tail portion 12 is adapted for the reception of a towing cord 54.

From the foregoing, the operation of the device should now be obvious. If it is desired to animate the decoy, cover 15 is removed and the switch lever 30 is thrown to either forward or reverse position as desired. The energization of motor 35 will then occasion, through shaft 47, flexible coupling 50 and shaft 44, the rotation of propeller 46, which will correspondingly occasion movement of the decoy in the desired direction. Obviously, ready access may be had to the battery or motor for repair or replacement as may be necessary.

From the foregoing, it will now be seen that there is herein provided an improved decoy which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

A decoy comprising a floatable hollow body portion, a removable top for said body, a battery in said body, an internal shaped framework in said body, said framework comprising a leg having a foot secured to said body, a downwardly and rearwardly sloped motor support formed integrally with the upper end of said leg, an arm extending integrally upwardly and rearwardly from the rear end of said motor support, and means securing the upper rear end of said arm to the upper rear portion of said body, a reversible motor mounted on said framework and driven by said battery, a shaft driven by said motor, a propeller shaft extending through said body, a propeller on the outer end of said propeller shaft, a tubular flexible rubber connection encompassing the inner end of said propeller shaft and the outer end of said driven shaft, and a reversing switch for said motor.

References Cited in the file of this patent

UNITED STATES PATENTS

| 1,110,245 | Vaughan | Sept. 8, 1914 |
| 2,443,040 | Jones | June 8, 1948 |
| 2,488,464 | Arpin | Nov. 15, 1949 |
| 2,515,511 | Hansen | July 18, 1950 |
| 2,709,316 | McCabe | May 31, 1955 |

FOREIGN PATENTS

| 488,804 | Canada | Dec. 16, 1952 |